May 7, 1957

F. S. BASTER 2,791,286

STEERING TANDEM REAR AXLE ASSEMBLY
FOR A TRACTOR OF SEMI-TRAILERS

Filed Feb. 4, 1953

INVENTOR.
FOREST S. BASTER

BY
RICHEY, WATTS, EDGERTON & McNENNY

ATTORNEYS

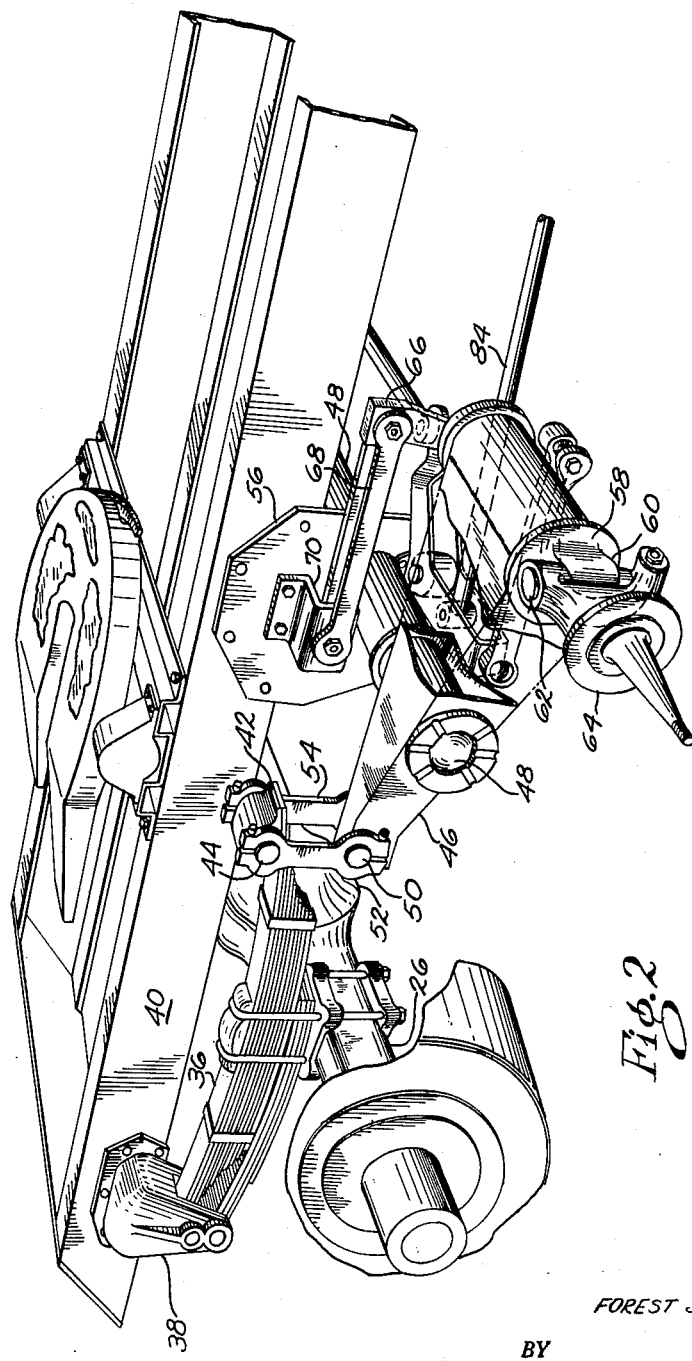

May 7, 1957  F. S. BASTER  2,791,286
STEERING TANDEM REAR AXLE ASSEMBLY
FOR A TRACTOR OF SEMI-TRAILERS
Filed Feb. 4, 1953  5 Sheets-Sheet 3

INVENTOR.
FOREST S. BASTER

BY
RICHEY, WATTS, EDGERTON & McNENNY

ATTORNEYS

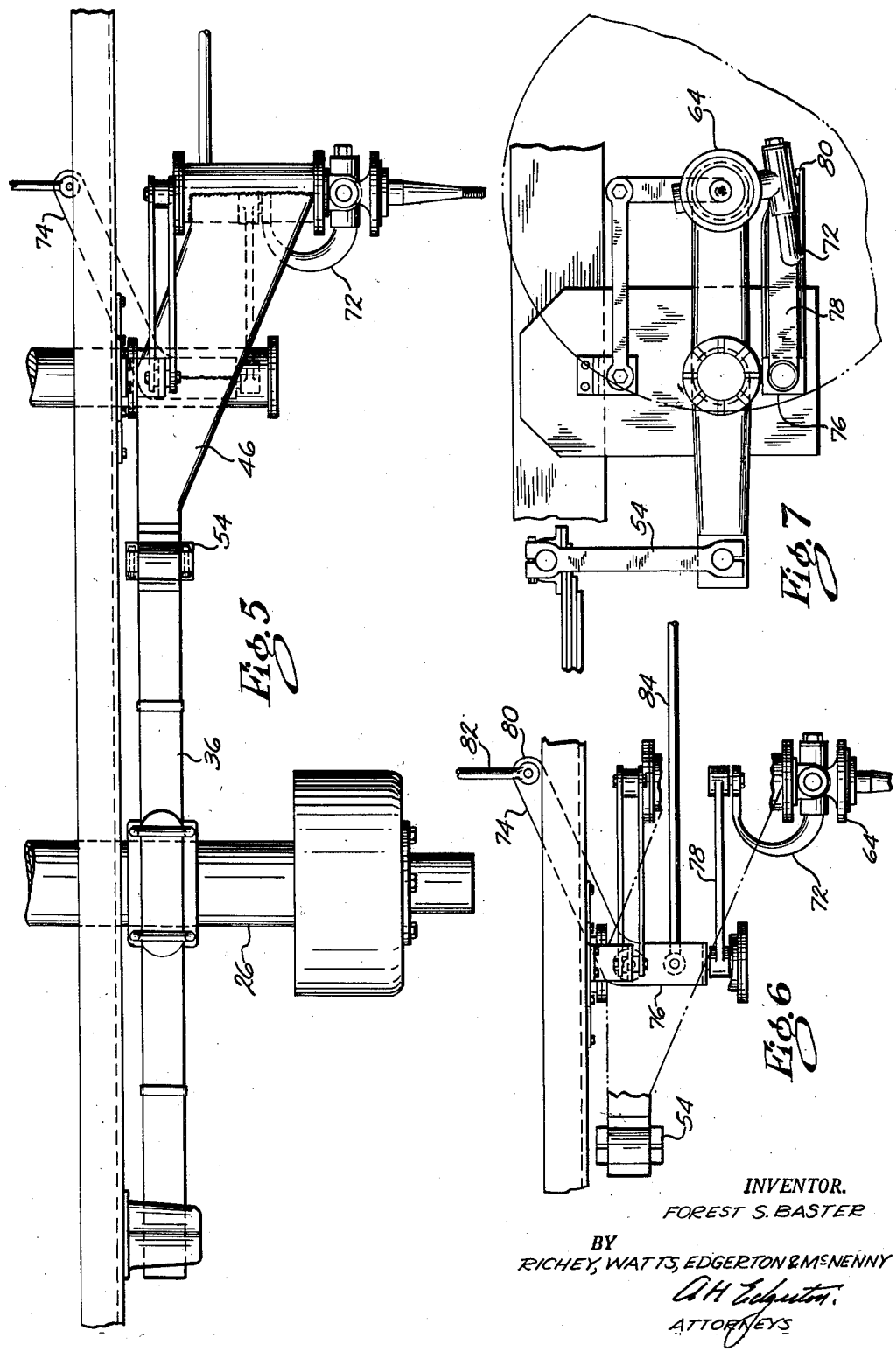

May 7, 1957 F. S. BASTER 2,791,286
STEERING TANDEM REAR AXLE ASSEMBLY
FOR A TRACTOR OF SEMI-TRAILERS
Filed Feb. 4, 1953 5 Sheets-Sheet 5

INVENTOR.
FOREST S. BASTER
BY
RICHEY, WATTS, EDGERTON & McNENNY
ATTORNEYS ated May 7, 1957

2,791,286

STEERING TANDEM REAR AXLE ASSEMBLY FOR A TRACTOR OF SEMI-TRAILERS

Forest S. Baster, Cleveland, Ohio, assignor to The White Motor Company, Cleveland, Ohio, a corporation of Ohio Application February 4, 1953, Serial No. 335,063

18 Claims. (Cl. 180—22)

This invention relates to vehicles of the truck-tractor type and, more particularly, to tractors for semi-trailers utilizing a two-rear-axle assembly.

One of the objects of this invention is to provide a load-carrying wheel arrangement which will facilitate the operation of vehicles of the tractor-semi-trailer type and to improve the function of the vehicle from the standpoint of maneuverability, latitude in loading, greater safety, and interchangeability in coupling with various tractors.

Another object of the invention is to provide a highway tractor type vehicle with the two-rear-axle combination suspended in such a manner as to permit the forward set of wheels of the two-axle combination to steer in proportion with the front steering wheels of the said vehicle.

Another object of the invention is to provide a highway tractor type of vehicle with a two-rear-axle spring suspension so as to permit the rear axle to support a greater proportion of the load than the forward axle of the two-rear-axle combination.

Another object of the invention is to provide a highway type tractor vehicle with a two-rear-axle combination suspended in such a fashion as to permit mounting a fifth wheel for a semi-trailer aft of the centerline of the two-axle combination.

Another object of the invention is to provide steering mechanism associated with the suspension assembly of a two-rear-axle combination in such a manner that ease of steering and control of the vehicle is not affected by changes in load or road conditions.

A still further object of this invention is to provide suspension apparatus which will maintain a constant caster and camber as the vehicle traverses uneven terrain.

Accordingly, the preferred embodiment of this invention is a truck-tractor having a conventional front axle with a two-axle assembly in the rear for increasing the load-carrying capacity of the vehicle. A driving axle is located to the rear of a pair of bogey stub axles and is provided with dual wheels mounted thereon. A compensating spring and linkage assembly distributes the load between the two-rear-axle combination in a proportional manner, the greater proportion of the load being carried by the rear or driving axle of the unit. In the preferred embodiment of this invention, single wheels are mounted on the ends of the bogey stub axle and the structure is arranged to place one-third of the loading on the bogey assembly and two-thirds of the load on the driving axle assembly. However, it is to be understood that any other combination or proportion of ratio of loads between axles may be used without departing from the spirit of this invention.

The operation of an interstate truck line with conventional equipment poses many problems for the operators if such a truck line is to operate at a profit. The first consideration is the gross weight which may be carried through the various States along the line of operation and be within the maximum limits set forth by the laws of the various States. The second consideration is the maximum axle weight set forth by the laws of the various States and the relation of the individual axle weights and/or combination axle weights to the gross weights. To carry the maximum gross weight or the maximum payload, it is generally necessary to carefully calculate and distribute the load in the trailer vehicle to prevent overloading of a given axle. The third consideration is the shape of the front end of the trailer which may be in either of the common forms of square or oval nose. The position of the coupler or fifth wheel will be different in relation to the tractor axles in the case of an oval nose than the case of a square nose trailer. The fourth consideration is the position of the landing gear relative to the king pin or coupling unit on the trailer. It is essential that the landing gear clear the rearmost wheels when the vehicle is turned so that definite limitations are attached to the positioning of the fifth wheel on the tractor. It is obvious, therefore, that when a trailer is to be transferred from one tractor to another, several hours times is required to make the necessary calculations and alterations to the equipment before the trailer can be moved on the highway with the necessary clearances, within the limits of mechanical stresses, and within the limits imposed by the laws. If the truck line is to operate efficiently and at a profit, the elimination of such lost time is highly desirable and the operation of the vehicle at a maximum payload is also essential. Therefore, it is an object of this invention to overcome the multiple problems imposed by the lack of the universality of design and loading and provide a tractor which may be coupled to any trailer without regard for specific cargo load calculations except as to overall gross load and the total weight on the rear-axle assembly.

To provide the loading tolerance required to reduce loading time and reloading to shift the weight distribution, it is necessary that more than one load-carrying axle be included in the tractor. A conventional tandem-axle tractor provides such load-carrying ability, but generally results in axle capacities far exceeding the legal gross limitations necessary to establish the required load tolerance. Since the tolerance desired is approximately two or three thousand pounds for these conditions, the conventional tandem is over-capacity, over-weight and inefficient. The provision of a two-rear-axle assembly having dual tires on one axle and single tires on the other is more practical since the additional capacity sufficient to carry any load concentration in the front of the trailer is provided thereby.

A steering mechanism is provided for the pusher-axle wheels which may be controlled by the steering gear for the front axle. By providing such steering, maneuverability is obtained, scuffing and excess wear of the tires is prevented, and adequate control is maintained over the vehicle when the loading on the front wheels is greatly reduced. A vehicle having the usual rigid tandem-rear-axle assembly tends to move in a straight-ahead direction due to the steering effect of the heavily loaded wheels. Under this condition, it is necessary that the loading on the front axle be exceedingly high to provide sufficient road friction with the tires to overcome the steering effect of the tandem-rear-axle and give adequate control of the vehicle under slippery and adverse road conditions. To accomplish this required loading on the front axle, the fifth wheel must be moved forward in relation to the rear-axle assembly, which in a conventional truck would result in interference between the rear tires and the landing gear in a turning condition. This results in a necessity for trailer equipment of a special design having the landing gear located rearwardly of the ordinary position. Obviously, flexibility of operation of this type of vehicle is immediately lost since trailer equipment of a special nature is required.

In an attempt to increase the load-carrying capacity of the tractor, additional axles have been placed both ahead and to the rearward of the driving axle; but, in either case, the fifth wheel must be located far enough forward to impose sufficient king pin load on the front axle to achieve stability of control. A generally accepted minimum safe condition for steering stability is reached when a tandem tractor has approximately 22% of the gross weight on the front wheels.

On most trailers, the landing gears are located at approximately eight feet from the front of the trailer and the standard king pin location is thirty-six inches from the front of the trailer. A general fifth wheel, therefore, may not be located more than sixteen inches ahead of the rear axle if clearance is provided between the rear wheels of the tractor and the landing gear cross bar during a turning operation.

A tractor with two-rear axles having these dimensional characteristics may be obtained by providing a suspension assembly having linkage which divides the axle loadings according to the number of wheels or tire capacity thereon. Further, the assembly should include structure which will allow the wheels on at least one axle to be steerable to render the tractor controllable without increase of load on the front axle. Such an assembly allows the fifth wheel to be located to the rear of the centerline of the two-rear-axle assembly and in the normal position relative to the rear axle found in single-rear-axle tractors. Since the linkage has been provided to handle the weight distribution in such a manner that the trailer may be loaded without particular attention to the longitudinal disposition of the weight and the fifth wheel location is normal relative to the rearmost tractor axle, many of the problems ordinarily faced by truck operators in connection with interchangeability of equipment and loading tolerance has been overcome.

Accordingly, it is an object of this invention to provide a two-rear-axle assembly which permits the carrying of increased loads without the necessity for moving the point of load concentration relative to the rear end of the vehicle thereby allowing interchangeability in trailer vehicles attached thereto and drawn by the tractor.

Another object of this invention is to provide a two-rear-axle combination which will provide safe operational control when the fifth wheel is positioned to permit the attachment thereto of trailer assemblies of standard design and wide use.

Other objects and advantages more or less ancillary to the foregoing, and the manner in which all the various objects are realized will appear in the following description, which, considered in connection with the accompanying drawings, sets forth the preferred embodiment of the invention.

In the drawings,

Fig. 2 is a fragmentary perspective view of the suspension and steering mechanism;

Fig. 5 is a fragmentary top view of the suspension and steering assembly;

Fig. 6 is a fragmentary view of a portion of the suspension assembly with parts cut away to show details of the steering mechanism;

Fig. 7 is a fragmentary side view of the bogey wheel suspension; and

Figure 1:
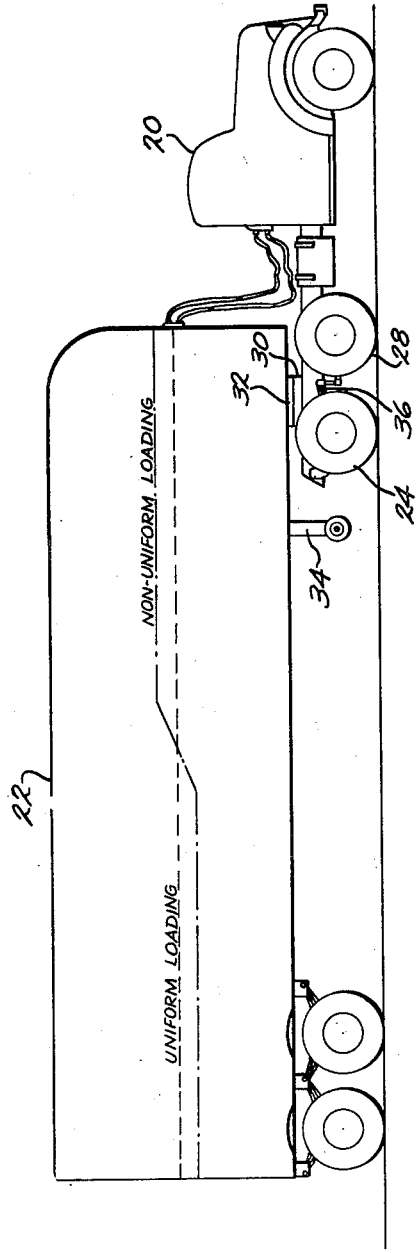
Fig. 1 is a side elevation of a tractor and trailer assembly embodying the invention herein described.
Figure 4:
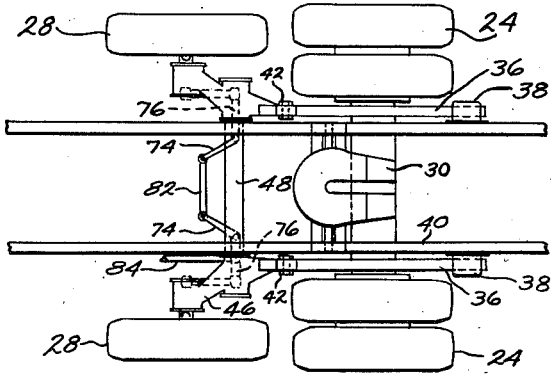
Fig. 4 is a diagrammatic plan view of the two-rear-axle assembly.
Figure 3:
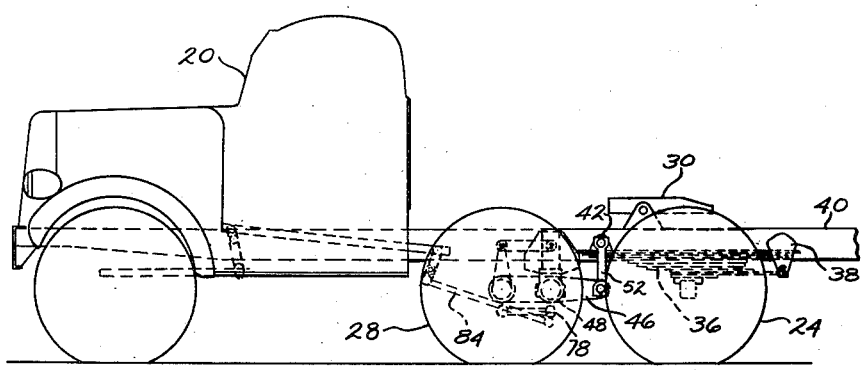
Fig. 3 is a diagrammatic view showing the relation of the parts of a tractor embodying the invention.
Figure 8:
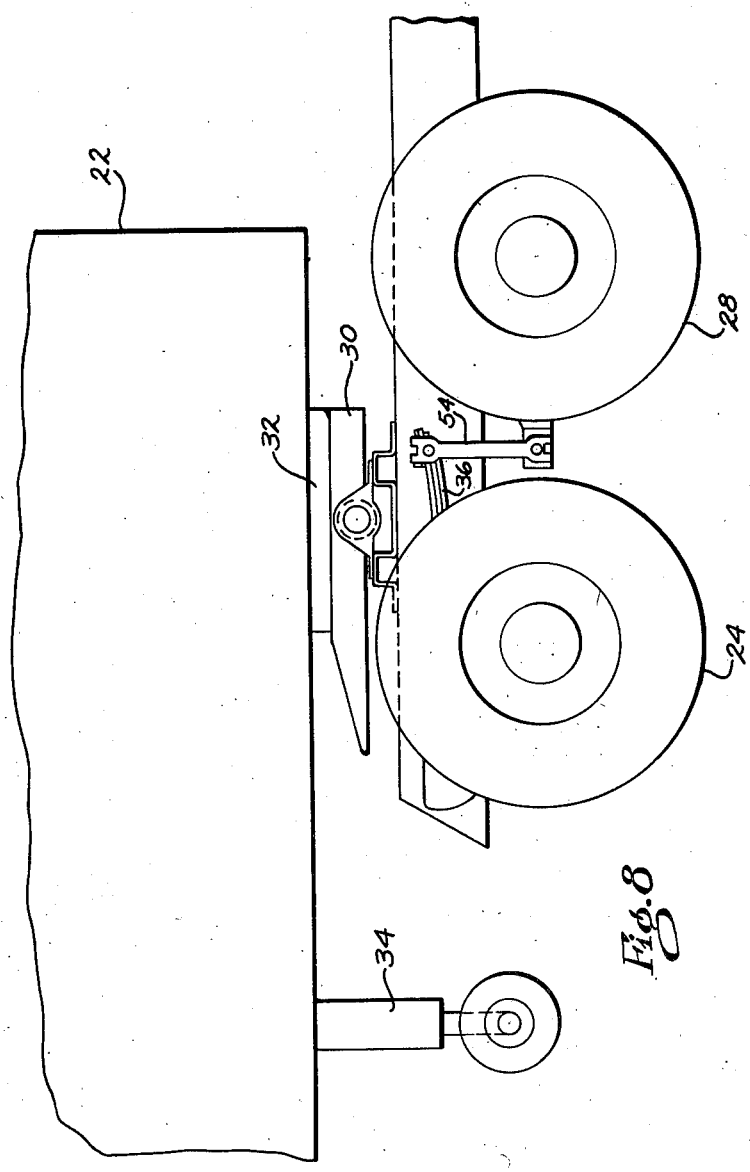
Fig. 8 is an enlarged fragmentary view of the tractor-trailer combination.

Referring first to Figs. 1, 3 and 4, there is shown a tractor-trailer truck, the tractor being designated by the numeral 20 and the numeral 22 designating the trailer assembly. The tractor is provided with a two-rear-axle assembly in which the rear dual wheels 24 are mounted on the driving axle 26, and the forward single wheel 28 is carried by suspension means which apportions the load in respect to the relative load-carrying ability of the wheels 24 and 28.

The fifth wheel 30 is located on the frame of the tractor 20 in the usual position relative to the rear axle 26, approximately eighteen inches forward of the centerline of the rear axle 26. The trailer 22 is connected to the tractor 20 by the king-pin assembly 32 engaging the fifth wheel 30. The landing gear 34 is located to the rearward of the king-pin 32 approximately five feet which is standard for conventional trailers in wide commercial use in interstate traffic. The landing gear 34 is placed as far forward on the trailer as feasible to allow sufficient clearance for turning the vehicle which requires that the tractor 20 be turned at a right angle to the trailer 22. The limiting distance of the landing gear 34 from the king pin 32 is determined by the distance of the fifth wheel 30 forward of the rearmost axle 26.

As shown in Fig. 2, the rear axle 26 is shackled to a leaf spring 36 of symmetrical shape having the rear end pivotally joined to the spring bracket 38 which is affixed to the frame 40 of the tractor 20. The forward end of the spring 36 carries a pillow block 42 which has journalled therein a pin 44.

An arm 46 of the type commonly referred to as a walking beam is rotatably mounted on a shaft 48 for rotative movement around an axis perpendicular to the longitudinal axis of the tractor 20. The rearward end of the beam 46 carries a pin 50. A pair of links 52 and 54 interconnect pins 44 and 50 and transmit force from the walking beam 46 to the forward end of the spring 36 through the block 42.

The cross shaft 48 is journalled in a shaft bracket 56 which is affixed to the frame 40. The load placed on the vehicle, therefore, is transmitted to the suspension assembly through the spring bracket 38 and the shaft bracket 56.

In the forward end of the walking beam 46, a stub axle 58 is rotatably mounted with the axis of rotation parallel to the centerline of the shaft 48 and perpendicular to the centerline of the tractor 20. The stub axle 58 is provided with a drilled projecting end 60 for receiving a king pin 62 which carries the spindle 64 on which the wheel 28 is mounted. The king pin mounting of the spindle 64 to the stub axle 58 allows the axis of the axle to be given an angular position relative to the rear axle 26, thus providing for steering as required when the vehicle is turned.

At the innermost end of the stub axle 58, an upwardly projecting arm 66 is affixed for controlling the angular position of the king pin 62 relative to the frame 40. A link 68 is pivotally joined at one end to the arm 66 and at the other end to an angle bracket 70. The centerline of the pivot in the bracket 70 is located above the centerline of the shaft 48, an equal distance to that of the distance of the pivot in the arm 66 above the center of the stub axle 58. This arrangement results in a parallelogram which maintains the angle of the king pin 62 constant relative to the frame 40 as the walking beam 46 pivots around the shaft 48. When the forward wheel 28 drops into a depression in the road, the forward end of the walking beam would move downwardly until the load is equalized by the end of the spring 36 applying an opposite moment to the walking beam 46 through the links 52 and 54. Under this condition, the caster will be controlled under all conditions of operation by virtue of the link 68 and the control arm 66 maintaining the constant relationship to the frame 40.

In the preferred embodiment of the invention, the king pin is tilted rearwardly of the vertical at an angle of approximately 3° thereby providing caster which tends to restore the wheel to the straight-ahead position after it has been turned. The upper end of the king pin is also tilted downwardly to provide camber to facilitate the steering. These angles are maintained constant thus providing the optimum in steering irrespective of the angular position of the walking beam 46 which is altered by unevenness in the road.

*Steering mechanism*

Details of the steering mechanism are clearly shown in Figs. 5, 6 and 7. The pivoted points of the steering gear are so located and arranged that the directional position of the wheels is maintained relatively constant when the wheels pass over irregularities in the road bed. The same is true for any particular loading of the vehicle, thereby obtaining optimum operation under all conditions.

A U-shaped steering arm 72 is affixed to the spindle 64 in the usual manner, the end of arm 72 being in alignment with the centerline of the spindle 64 and king pin 62. Further, the end of the arm 72 is directly beneath and in a plane formed by the centerline of the stub axle 58 and the pivot at the end of link 68.

A bell crank 74 is pivoted on the lower end of the bracket 56 with the center of rotation in the vertical plane joining the center of the shaft 48 and the pivot at the end of the link 68. When the wheel is in the straight-ahead position, the arm 76 of the bell crank 74 is parallel to the center of the shaft 48. A drag link 78 is pivotally joined at each end to the arm 72 and the bell crank 74, the centerline of the link 78 being parallel to the centerline of the vehicle when the wheels are in the straightaway position. The link 78 is parallel to the walking beam 46 and the link 68, thus establishing parallelism at all positions of the walking beam and maintaining the predetermined relative position of the wheel to the vehicle at all positions of the walking beam. The arm 80 of the bell crank 74 is joined by a tie rod 82 to a similar bell crank on the opposite side of the vehicle.

The steering control from the regular steering gear is obtained by a rod 84 operably connected thereto to provide movement toward the rear of the truck when the vehicle is turned to the left. The end of the rod 84 is pivoted to the arm 76 of the bell crank 74 and thereby produces the necessary angular movement of the bell crank 74 when the rod 84 is positioned. Since the spindles 64 on each side of the vehicle respectively are interconnected, the steering effect is transmitted therethrough, thus causing the wheels of the bogey to trail the front wheels of the tractor.

By prodiving accentuated camber, the steering control from the front end steering gear of the tractor may be eliminated and the dirigible wheels on the bogey may be operated by self-steering. When the tractor is turned on the road, relatively small force is required to steer the vehicle having the dirigible wheels since the scuffing and friction tending to maintain the vehicle in a straight course is eliminated.

When the vehicle is loaded as shown in Fig. 1 wherein the dotted-line representation designated uniform loading shows the load to be distributed equally throughout the length of the trailer, the trailer could be attached to a conventional tractor having a single-rear axle and the regulatory laws would not be violated. When the load is distributed as shown by the non-uniform loading line, the trailer could not be operated in the regular manner. By utilizing the invention disclosed herein, it is possible to operate a vehicle loaded in this manner, thus eliminating removing the load and reloading to obtain uniform distribution of weight. When the excess load is placed in the front of the trailer, the weight is transmitted through the fifth wheel 30 to the frame of the vehicle. The spring and walking beam assembly is proportioned to distribute this weight on the wheels in such a manner that the axle loading is below the maximum set by the regulations.

In attaching the trailer to the tractor, it is unnecessary to make modifications in the location of any of the parts thereof since the fifth wheel is in the normal position relative to the rear axle. It is not necessary, therefore, to relocate the landing gear to clear the rear wheels as would be necessary if the fifth wheel were moved forward as in the case of the conventional tandem axle rigid assembly.

When the vehicle is turned, the dirigible wheels on the bogey axles assume a position wherein all the wheels are following circular paths having a common center. This results in ease of control not previously obtained in a tandem-rear axle vehicle when the fifth wheel is located to the rearward of the lateral centerline of the tandem-axle assembly. A rigid tandem-axle assembly requires that at least 20% of the weight of the load be impressed on the front axle. However, by using the dirigible wheels, there is no requirement for transmitting the load to the front wheels. This feature further increases the ease with which the vehicle may be controlled by eliminating the high loading on the front tires.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A land vehicle comprising in combination a chassis, a forward axle, tandem rear axles, and a fifth wheel on the chassis located to the rearward of the medial line between the tandem axles, the wheels on one of said tandem axles being dirigible.

2. A land vehicle comprising in combination a chassis, a forward axle, tandem rear axles, and a fifth wheel on the chassis located to the rearward of the medial line between the tandem axles, the wheels on the forward axle of said tandem axles being dirigible.

3. A land vehicle comprising in combination a chassis, a front axle, a two-rear-axle assembly, a fifth wheel located on said chassis to the rearward of the lateral centerline of said two-rear-axle assembly, said two-axle assembly including steering means for the forward axle of said assembly.

4. A land vehicle comprising in combination a chassis, a front axle, a tandem-rear-axle assembly, a fifth wheel located on said chassis to the rearward of the lateral centerline of said tandem-axle assembly, said tandem-axle assembly including steering means for one of the axles.

5. A land vehicle comprising in combination a chassis, a front axle and steering means therefor, a tandem-rear-axle assembly, a fifth wheel located on said chassis to the rearward of the lateral centerline of said tandem-axle assembly, said tandem-axle assembly including steering means for one of said tandem axles connected to said front axle steering means.

6. A land vehicle comprising in combination a chassis, a front axle, a tandem-rear-axle assembly, a fifth wheel located to the rearward of the lateral centerline of said assembly, said assembly including a rear driving axle having dual wheels mounted thereon, a forward axle having single wheels individually suspended, and steering means for said single wheels.

7. A land vehicle comprising in combination a chassis, a front axle and steering means therefor, a tandem-rear-axle assembly, a fifth wheel located to the rearward of the lateral centerline of said assembly, said assembly including a rear driving axle having dual wheels mounted thereon, a forward axle having single wheels individually suspended, and steering means for said single wheels operably connected to said front axle steering means.

8. A land vehicle comprising a frame, a front axle, a tandem-rear-axle assembly, a fifth wheel located on the frame to the rearward of the lateral centerline of said assembly, said assembly including a driving axle having dual wheels mounted thereon, an axle having single dirigible wheels, and spring suspension means interconnecting said axles in said frame for distributing the load to said wheels.

9. A land vehicle comprising a frame, a front axle, a tandem-rear-axle assembly, a fifth wheel located on the frame to the rearward of the lateral centerline of said assembly, said assembly including a driving axle having dual wheels mounted thereon, an axle having single wheels, spring suspension means interconnecting said axles in said frame for distributing the load equally between said wheels, and steering means for said single wheels.

10. A land vehicle comprising a frame, a front axle, a two-rear-axle assembly, a fifth wheel located on the frame to the rearward of the lateral centerline of said assembly, said assembly including a driving axle having dual wheels mounted thereon, an axle having single wheels, spring suspension means interconnecting said axles and said frame for distributing the load to said wheels, and steering means for said single wheels.

11. A land vehicle comprising in combination a chassis, a front axle, a two-rear-axle assembly, a fifth wheel located to the rearward of the lateral centerline of said assembly, said assembly including a driving axle having dual wheels mounted thereon, an axle having single wheels individually suspended, and steering means for said single wheels.

12. A land vehicle comprising a frame, a front axle, a two-rear-axle assembly, a fifth wheel on the frame located to the rearward of the lateral center line of said assembly, said assembly including a driving axle having dual wheels mounted thereon, a second axle having single wheels mounted thereon, spring suspension means interconnecting said axles and said frame for distributing a predetermined relative load to said wheels, said second axle being pivotally mounted relative to the frame, the vertical axis of the mounting being inclined to provide caster and camber whereby the wheels thereon will be self-steering during a turning operation of the vehicle.

13. A land vehicle comprising a frame, a front axle, a two-rear-axle assembly, said assembly including a driving axle having dual wheels mounted thereon, stub axles having single wheels mounted thereon, arms pivotally mounted on the frame, said stub axles being pivotally joined to one end of the arms, and spring suspension means interconnecting said driving axle, the arms, and said frame whereby said means, and said arm distribute a predetermined relative load to said wheels.

14. A land vehicle comprising a frame, a front axle, a two-rear-axle assembly, said assembly including a driving axle having dual wheels mounted thereon, a stub axle having a single wheel mounted thereon for swinging about an axis, an arm pivotally mounted on the frame, said stub axle being pivotally jointed to one end of the arm, spring suspension means interconnecting said driving axle, the arm, and said frame for distributing a predetermined relative load to said wheels, the axis of the stub axle mounting being inclined to provide caster and camber whereby the single wheels will be self-steering during a turning operation of the vehicle.

15. A land vehicle comprising in combination a chassis, a front axle having a steering assembly, a two-rear-axle assembly, said assembly including a driving axle having dual wheels mounted thereon, individually suspended stub axles having single wheels, a spindle for each of said single wheels swingably joined to said stub axle, an arm carried by said spindle, a crank for each single wheel joined to the chassis and having one end linked to said spindle arm and the other end linked to the steering assembly for the front axle, and a tie rod operably connecting said cranks.

16. A land vehicle comprising a frame, a front axle, a two-rear-axle assembly, said assembly including a driving axle mounted thereon, stub axles having single wheels mounted thereon, arms pivotally mounted on the frame, said stub axles being journalled to one end of the arms, linkage means joined to said stub axles and said frame for controlling the position of the stub axles, and spring suspension means interconnecting said driving axle, the arms and said frame whereby said spring suspension means and said arms distribute a predetermined relative load to said axles.

17. A land vehicle comprising in combination a frame, a front axle and a steering means therefor, a tandem rear axle assembly affixed to said frame, said assembly including a driving axle and a second axle means having single wheels mounted thereon, said second axle means including a stub axle having a spindle and kingpin assembly at one end, an arm swingably mounted on said frame, said stub axle being journalled in one end of said arm, linkage means joined to the stub axle and the frame for controlling the position of the kingpin and spring suspension means interconnecting said driving axle, the arm and said frame whereby said spring suspension means and said arm distribute a predetermined relative load to said axles.

18. A land vehicle comprising in combination a chassis, a front axle having a steering assembly, a two rear axle assembly, said assembly including a driving axle individually suspended stub axles having single wheels, a spindle for each of said single wheels swingably joined to the stub axle, an arm swingably mounted on said frame, said stub axle being journalled in said arm, linkage means joined to said stub axle and said frame for controlling the position of the stub axle, a second arm carried by said spindle, and a crank joined to the chassis and having one end linked to said second arm and the other end linked to the steering assembly for the front axle.

References Cited in the file of this patent

UNITED STATES PATENTS

| 1,655,481 | Van Leuven | Jan. 10, 1928 |
| 1,660,188 | Fageol | Feb. 21, 1928 |
| 1,905,865 | Hawkins et al. | Apr. 25, 1933 |
| 1,989,745 | Farris | Feb. 5, 1935 |
| 2,135,906 | Merry | Nov. 8, 1938 |
| 2,223,650 | Weber | Dec. 3, 1940 |
| 2,359,978 | Edwards | Oct. 10, 1944 |
| 2,698,668 | McKay | Jan. 4, 1955 |

FOREIGN PATENTS

| 524,524 | Germany | May 12, 1931 |

OTHER REFERENCES

"Automobile Engineer" (periodical); vol. 42; issue No. 552. Pub. date: April 1952; only page 146 need be ordered.